United States Patent
Kim

(10) Patent No.: US 8,789,994 B2
(45) Date of Patent: Jul. 29, 2014

(54) ANTENNA WITH LIGHTING FUNCTION FOR MOBILE COMMUNICATION SYSTEM

(75) Inventor: Duk-Yong Kim, Gyeonggi-do (KR)

(73) Assignee: KMW Inc., Yeongcheon-ri, Dongtan-myeon, Hwaseong-si, Gyeonggi-do (KR)

( * ) Notice: Subject to any disclaimer, the term of this patent is extended or adjusted under 35 U.S.C. 154(b) by 119 days.

(21) Appl. No.: 13/203,421

(22) PCT Filed: Feb. 25, 2010

(86) PCT No.: PCT/KR2010/001192
§ 371 (c)(1),
(2), (4) Date: Aug. 25, 2011

(87) PCT Pub. No.: WO2010/098602
PCT Pub. Date: Sep. 2, 2010

(65) Prior Publication Data
US 2011/0299299 A1    Dec. 8, 2011

(30) Foreign Application Priority Data
Feb. 27, 2009  (KR) .................... 10-2009-0017287

(51) Int. Cl.
*F21V 21/00* (2006.01)
*F21V 8/00* (2006.01)

(52) U.S. Cl.
USPC ........... 362/613; 362/612; 362/235; 362/234; 362/249.02

(58) Field of Classification Search
None
See application file for complete search history.

(56) References Cited

U.S. PATENT DOCUMENTS

| | | | | |
|---|---|---|---|---|
| 5,917,453 A | * | 6/1999 | Uchino et al. | 343/721 |
| 6,130,646 A | * | 10/2000 | Jang | 343/721 |
| 6,215,984 B1 | * | 4/2001 | Figueras et al. | 455/575.7 |
| 6,262,686 B1 | * | 7/2001 | Delarminat et al. | 343/721 |
| 6,788,256 B2 | * | 9/2004 | Hollister | 343/700 MS |
| 8,203,501 B2 | * | 6/2012 | Kim | 343/890 |
| 8,416,144 B2 | * | 4/2013 | Lindberg et al. | 343/834 |
| 2006/0187113 A1 | * | 8/2006 | Korte | 342/176 |
| 2007/0052602 A1 | * | 3/2007 | Ibi et al. | 343/721 |
| 2007/0262911 A1 | * | 11/2007 | Kim | 343/757 |
| 2009/0040750 A1 | * | 2/2009 | Myer | 362/183 |
| 2009/0059114 A1 | * | 3/2009 | Lin et al. | 349/60 |

FOREIGN PATENT DOCUMENTS

| | | | |
|---|---|---|---|
| CN | 1256524 A | 6/2000 | |
| GB | 2332119 A | 6/1999 | |
| JP | 62-103303 U | 7/1987 | |
| JP | 02-262703 A | 10/1990 | |
| JP | 04-306006 | 10/1992 | ............ H01Q 1/12 |
| JP | 05-039009 U | 5/1993 | |
| JP | 09212760 A | * 8/1997 | |
| JP | 09-246834 A | 9/1997 | |
| JP | 3054907 U | 9/1998 | |
| JP | 11-059229 A | 3/1999 | |
| JP | 2004-312696 A | 11/2004 | |
| JP | 2009-004866 A | 1/2009 | |
| KR | 20-0449096 | 6/2010 | ............ F21V 17/00 |
| KR | 20-0450063 | 9/2010 | ............ H01Q 1/44 |

OTHER PUBLICATIONS

Machine English transaltion of JP 9212760 to Moriaki.*

* cited by examiner

*Primary Examiner* — Sikha Roy
(74) *Attorney, Agent, or Firm* — Cha & Reiter, LLC

(57) ABSTRACT

An antenna with a lighting function for a mobile communication system is provided. The antenna includes a radome for passing or spreading light through at least one specific part, and at least one light source for irradiating light to the radome.

18 Claims, 5 Drawing Sheets

Fig. 4
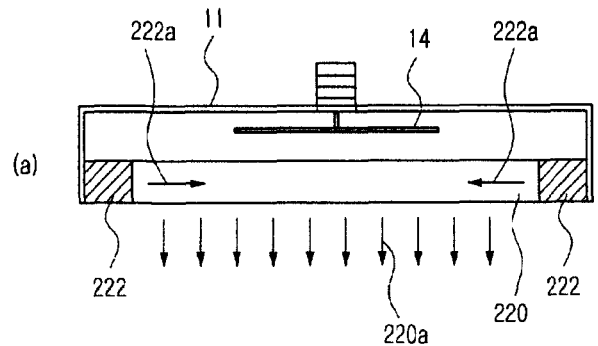
(a)
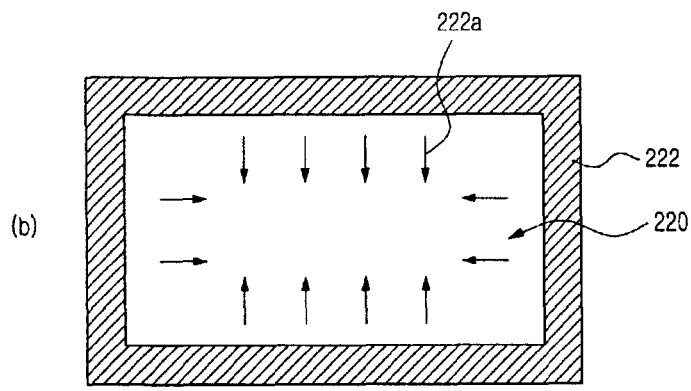
(b)
Fig. 5
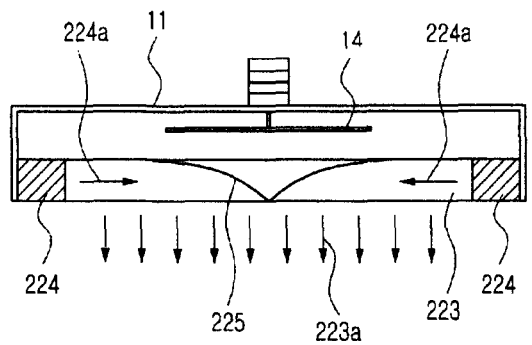
Fig. 6
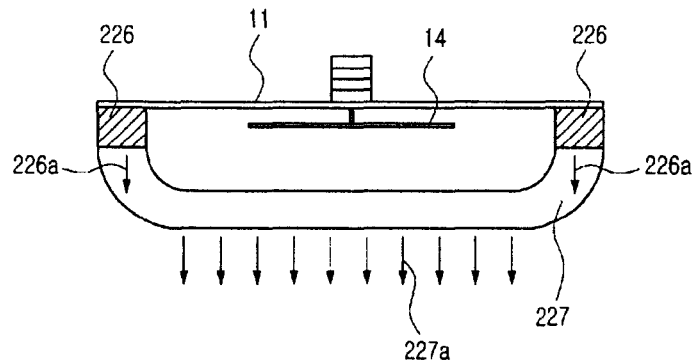

ANTENNA WITH LIGHTING FUNCTION FOR MOBILE COMMUNICATION SYSTEM

This application makes reference to and claims all benefits from an application entitled ANTENNA WITH LIGHTING FUNCTION FOR MOBILE COMMUNICATION SYSTEM filed in the Korean Intellectual Property Office on Feb. 25, 2010 and there duly designed Serial No. PCT/KR2010/001192, which in turn claims a priority to an earlier Korean Patent Application No. 10-2009-0017287 filed on Feb. 27, 2009.

TECHNICAL FIELD

The present invention relates generally to an antenna, and more particularly, to an antenna for a mobile communication system, which can have a lighting function.

BACKGROUND ART

In general, antennas for mobile communication systems are installed on higher places using telegraph poles and the like to increase their possible propagation distances. For instance, the antennas are installed on roofs of buildings in urban areas, and mounted at different heights on plains or mountain tops in suburban or rural areas.

As a common example, in urban areas, poles are set up on roofs of buildings, fixing bars are mounted on tops of the poles, and then communication antennas are installed on the fixing bars.

Because antennas for mobile communication systems are installed on high places such as building roofs in urban areas, the mobile communications antennas are well noticeable to human eyes, spoiling the scenic beauty of surroundings in the urban areas. Such antenna installation may significantly harm environments of buildings especially when a large number of mobile communication antennas are installed in the buildings by many different carriers, causing a reduction in values of the buildings.

In particular, in-building antennas installed in skyscrapers should not spoil the beauty of indoor environments, which makes it very difficult to install the antennas in proper places.

Even though the mobile communications antennas should be installed in appropriate locations to provide seamless wireless communications, most building owners avoid the antenna installation because of the spoiling of the beauty of the buildings or surroundings.

DISCLOSURE OF INVENTION

Technical Problem

An aspect of the present invention is to address at least the above-mentioned problems and/or disadvantages and to provide at least the advantages described below. Accordingly, an aspect of the present invention provides an antenna with a lighting function for a mobile communication system, in which a lighting function is added to an antenna radome so that the antenna radome may be installed in replacement of lightings, facilitating easy securing of installation places.

Another aspect of the present invention provides an antenna with a lighting function for a mobile communication system, which facilitates easy securing of commercial power and may be easily connected to a communication cable.

A further another aspect of the present invention provides an environment-friendly antenna with a lighting function for a mobile communication system, which can be harmonized with surroundings such as buildings, apartments and parks, by virtue of its elegant appearance.

Solution to Problem

In accordance with one aspect of the present invention, an antenna with a lighting function for a mobile communication system is provided. The antenna includes a radome for passing or spreading light through at least one specific part, and at least one light source for irradiating light to the radome.

Advantageous Effects of Invention

As is apparent from the forgoing description, by adding a lighting function to a radome, an antenna with a lighting function for a mobile communication system according to exemplary embodiments of the present invention is environment-friendly as it is manufactured in the form of a certain sculpture matching with the topography of installation environments. Hence, the mobile communications antenna serves not only as a mere antenna, but also as a sculpture with elegant appearance, allowing people to take a more intimate view and improving the natural beauty of the surroundings.

When installed in an apartment complex and parks, the mobile communications antennas may be used as lighting lamps or load lamps, enabling various applications and solving the possible environmental problem caused by the antenna.

Also, when used as in-building antennas in skyscrapers, the mobile communications antennas may be installed in the places onto which lighting equipments such as lighting lamps and emergency exit lamps may be attached, facilitating easy securing of installation places and providing elegant indoor environments.

BRIEF DESCRIPTION OF DRAWINGS

The above and other aspects, features and advantages of certain exemplary embodiments of the present invention will be more apparent from the following description taken in conjunction with the accompanying drawings, in which:

FIG. 4 is plan and side view of a principal part of an antenna with a lighting function for a mobile communication system according to a third embodiment of the present invention, respectively;

FIG. 5 is a view showing a first exemplary modification of the antenna shown in FIG. 4;

FIG. 6 is a view showing a second exemplary modification of the antenna shown in FIG. 4;

MODE FOR THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

Figure 1:
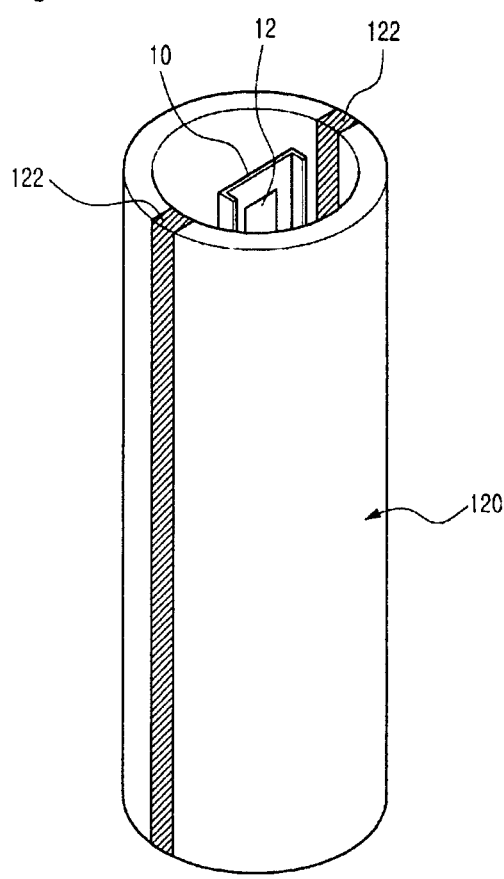
FIG. 1 is a schematic perspective view of a principal part of an antenna with a lighting function for a mobile communication system according to a first embodiment of the present invention.
Figure 2:
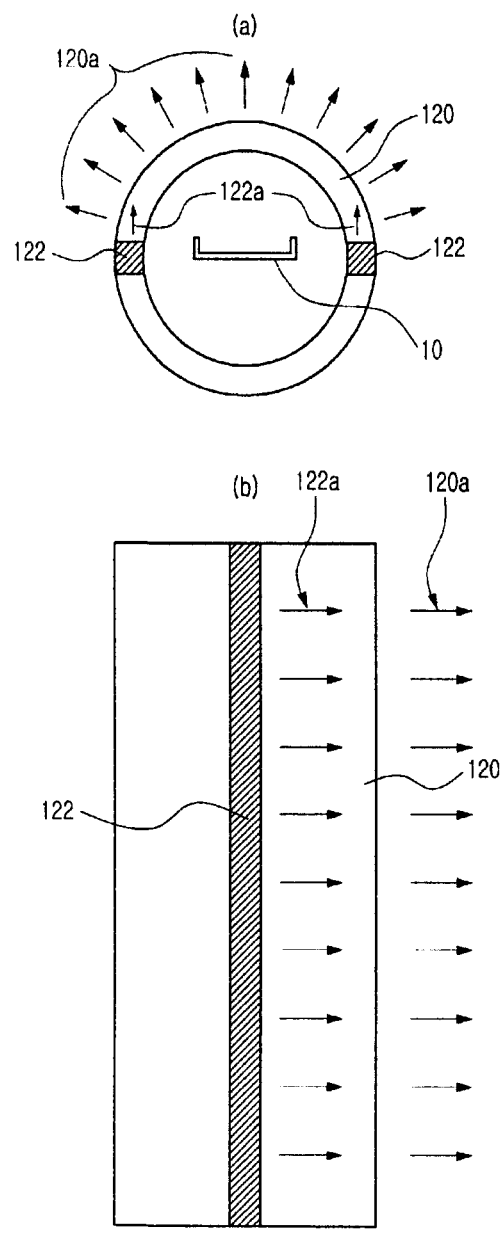
FIG. 2 is plan and side view of the antenna shown in FIG. 1, respectively.

FIG. 1 is a schematic perspective view of a principal part of an antenna with a lighting function for a mobile communication system according to a first embodiment of the present invention, and FIGS. 2(a) and 2(b) are plan and side views of the antenna shown in FIG. 1, respectively. Referring to FIGS. 1, and 2, an antenna for a mobile communication system generally includes a reflector 10, on which radiation devices 12 are mounted to transmit/receive wireless signals, and a feeding circuit (not shown), and various devices including the antenna reflector 10 are sealed up with a radome 120.

The radome 120 may be made of a plastic material such as Fiber Reinforced Plastic (FRP), Acrylonitrile Styrene Acrylate (ASA) and PolyVinyl Chloride (PVC), forming the overall shape of the antenna, and has a structure of passing or spreading light through at least one specific part according to features of the present invention. More specifically, the radome 120 has a structure of a Light Guiding Plate (LGP) formed in at least one a specific part, which receives light generated from chip-type light sources 122 arranged at sides, such as Light Emitting Diodes (LEDs) for lighting, as waveguided light 122a, and emits the received light to the front side (and/or the back side) as lighting light 120a.

A lighting extracting pattern such as a protrusion, a ripple and a V-shaped groove may be formed on the surface of the LGP structure to emit the waveguided light 122a, which is incident from the chip-type light sources 122 through sides and propagates through a waveguide layer of the LGP, to the outside or the front side of the LGP structure as the lighting light 120a. The LGP structure may have the same structure as the structure used in a LED backlight lamp structure, and the LGP-related technology is disclosed in U.S. Patent Publication No. 20090040771, filed by Greener Jehuda et al., entitled "Thin Light Guiding Plate and Methods of Manufacturing the Same", and U.S. Patent Publication No. 20070262332, field by Sung Min Kong, entitled "Light Emitting Device and Method for Fabricating the Same."

In the example shown in FIGS. 1, and 2, the chip-type light sources 122 are installed on longitudinal sides of the radome 120, so that LGP structure may emit light generated from the chip-type light sources 122 to the front side of the antenna. Radome 120 is shown to have a cylindrical shape.

Based on such structure, the antenna with a lighting function for a mobile communication system according to the present invention has a structure in which the radome 120 emits by itself the light generated from the chip-type light sources 122.

Figure 3:
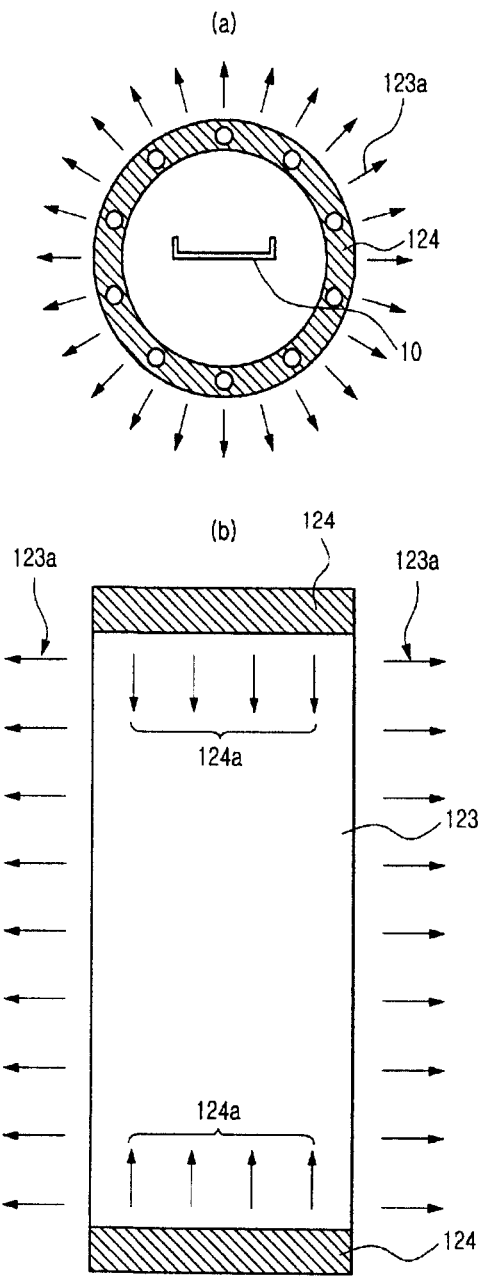
FIG. 3 is plan and side view of a principal part of an antenna with a lighting function for a mobile communication system according to a second embodiment of the present invention, respectively.

FIG. 3 is plan and side view of a principal part of an antenna with a lighting function for a mobile communication system according to a second embodiment of the present invention, respectively. The structure of the second embodiment shown in FIG. 3 is similar to the structure shown in FIGS. 1, and 2, except that a radome 123 according to the second embodiment has an LGP structure of receiving light generated from chip-type light sources 124 mounted (circumferentially, as illustrated) on the top and bottom and emitting the received light to the outside of the antenna. That is, the LGP structure emits waveguided light 124a, which is incident from the chip-type light sources 124 on the top and bottom in the up-down direction and propagates through a waveguide layer of the LGP, to the outside of the LGP structure as lighting light 123a.

FIG. 4 is plan and side view of a principal part of an antenna with a lighting function for a mobile communication system according to a third embodiment of the present invention, respectively. The antenna structure shown in FIG. 4 is suitable to be installed mainly in buildings, and according to features of the present invention, a radome of an antenna with a radiation device 14 includes a housing 11 with one side open, and a cover 220 that is engaged with the open side of the housing 11 and passes or spreads light generated from chip-type light sources 222, which may include LEDs for lighting.

More specifically, the cover 220 has an LGP structure for emitting light generated from chip-type light sources 222 mounted on the top, bottom, left and right outer sides to the front side of the antenna as shown in FIG. 4(b). The LGP structure emits waveguided light 222a, which is incident from the chip-type light sources 222 mounted on the top and bottom sides and/or the left and right sides in the top-down direction and/or the left-right direction, and propagates through a waveguide layer of the LGP, to the outside or the front side of the LGP structure as lighting light 220a.

While the overall antenna structure to which the present invention is applied has a box shape as shown in FIG. 4(b), it may have a pyramid shape or a conical shape. When the antenna has a conical structure, the cover may have a disc shape as a whole and the chip-type light sources may be installed in a circular ring shape as a whole along the side of the cover.

FIG. 5 is a view showing a first exemplary modification of the antenna shown in FIG. 4. A structure shown in FIG. 5 is similar to the structure of FIG. 4, but it further includes a light reflecting member 225 with which the cover 220 appropriately reflects waveguided light 224a, which is generated from chip-type light sources 224 on the top, bottom, left and right sides and propagates inside the LGP structure, and emits the reflected light to the front side as lighting light 223a.

FIG. 6 is a view showing a second exemplary modification of the antenna shown in FIG. 4. A structure shown in FIG. 6 is similar to the structure of FIG. 4, except that the housing 11 is formed in the form of a flat board, and a cover 227 having a proper volume is formed in the form of wrapping an internal radiation device 14. The cover 227 emits waveguided light 226a, which is generated from chip-type light sources 226 attached onto the flat-type housing 11 and propagates along the inside of the LGP structure, to the front side as lighting light 227a.

Figure 7:
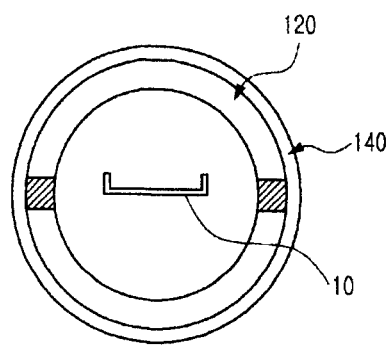
FIG. 7 is a plan view of a principal part of an antenna with a lighting function for a mobile communication system according to a fourth embodiment of the present invention.

FIG. 7 is a plan view of a principal part of an antenna with a lighting function for a mobile communication system according to a fourth embodiment of the present invention. A structure of the fourth embodiment shown in FIG. 7 is similar to the structure of the first embodiment shown in FIGS. 1, and 2, except that a transparent protection layer 140 is provided in an overlapping manner to protect inner devices including the radome 120 from the external environment of the radome 120. The radome 120 and the protection layer 140 may be manufactured in an integrated manner at the same time by means of double extrusion.

Figure 8:
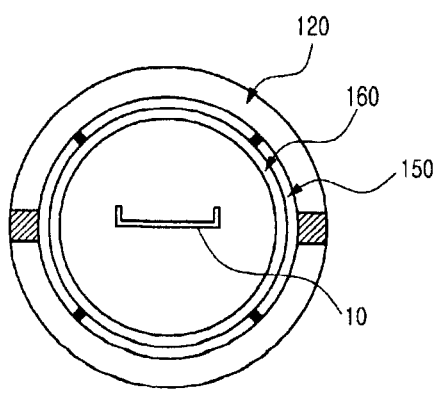
FIG. 8 is a plan view of a principal part of an antenna with a lighting function for a mobile communication system according to a fifth embodiment of the present invention.

FIG. 8 is a plan view of a principal part of an antenna with a lighting function for a mobile communication system according to a fifth embodiment of the present invention. A structure of the fifth embodiment shown in FIG. 8 is similar to the structure of the first embodiment shown in FIGS. 1 and 2, except that it further includes an inner radome 160 to more stably support and protect various inner devices including the reflector 10 inside the radome 120. The inner radome 160 and the radome 120 may be installed such that an air layer 150 may be formed to keep a gap between the two radomes.

While the invention has been shown and described with reference to certain exemplary embodiments thereof, it will be understood by those skilled in the art that various changes in form and details may be made therein without departing from the spirit and scope of the invention as defined by the appended claims and their equivalents.

For example, a light reflecting layer may be formed on an inner surface of the housing 11 in the form of a coating film to increase efficiency of the lighting light.

The invention claimed is:

1. An antenna/radome apparatus with a lighting function for a mobile communication system, comprising:
   at least one radiation device to transmit/receive wireless signals of the mobile communication system;
   a radome having a tubular structure surrounding the at least one radiation device, and forming an exterior shape of the apparatus, the radome passing or spreading light through at least one specific part formed with a Light Guiding Plate (LGP) structure;
   a plurality of longitudinally arranged chip-type light sources installed on opposite sides of the radome;
   wherein the LGP structure is formed to receive light generated from the light sources and emit the received light through the radome to the exterior; and
   wherein the apparatus is configured for ground based or building installation to operate as an outdoor light fixture or a building light fixture.

2. The antenna/radome apparatus of claim 1, wherein the plurality of chip-type light sources are Light Emitting Diode (LED) light sources.

3. The antenna/radome apparatus of claim 1, wherein a light extracting pattern is formed on a surface of the LGP structure, the light extracting pattern selected from a protrusion, a ripple and a V-shaped groove.

4. The antenna with a lighting function of claim 1, further comprising a protection layer provided on the outside of the radome to protect inner devices from an external environment.

5. The antenna/radome apparatus of claim 1, wherein the radome is an outer radome, and the apparatus further comprising an inner radome mounted on an inside of the outer radome to support and protect inner devices.

6. The antenna/radome apparatus of claim 5, wherein the inner radome is separated from the outer radome by an air layer.

7. The antenna/radome apparatus of claim 1, wherein the radome is in the shape of a cylinder, and the at least one radiation device comprises a plurality of radiation devices mounted on a reflector in a central region of the radome.

8. An antenna/radome combination comprising:
   a mobile communications antenna of a mobile communications system, disposed at a central region of a radome, including at least one radiation device mounted on a reflector to transmit/receive wireless signals of the mobile communications system; and
   a plurality of light sources arranged circumferentially around an outer region of the radome for irradiating light to at least a portion of the radome which is formed with a light guided plate (LGP) structure, wherein the radome passes or spreads the irradiated light therethrough.

9. The antenna/radome combination of claim 8, wherein the radome is in the shape of a cylinder, and the at least one radiation device is a plurality of radiation devices mounted on the reflector.

10. The antenna/radome combination of claim 8, wherein the radome is tubular and the plurality of chip-type light sources are arranged in at least one ring around the outer region.

11. The antenna/radome combination of claim 10, wherein the plurality of light sources are arranged in each of a top ring and a bottom ring of the radome.

12. The antenna/radome combination of claim 8, wherein the radome comprises a housing with at least one side open, and a cover engaged with the open side of the housing to pass or spread light.

13. The antenna/radome combination of claim 12, wherein the portion of the radome which is formed with a LGP structure is the cover.

14. The antenna/radome combination of claim 13, wherein the cover further comprises a light reflecting member for reflecting light emitted from the light sources to emit the light to the exterior.

15. The antenna/radome combination of claim 8, further comprising a light reflecting member for reflecting light emitted from the light sources to emit the light to the exterior.

16. The antenna/radome combination of claim 8, wherein the radome is in the shape of a box, and the plurality of light sources are installed along a perimeter of the box.

17. The antenna/radome combination of claim 8, wherein the radome is in the shape of a cylinder, and the plurality of light sources are installed circumferentially in each of the top and bottom portions of the cylinder.

18. The antenna/radome combination of claim 8, wherein a light extracting pattern is formed on a surface of the LGP structure, the light extracting pattern selected from a protrusion, a ripple and a V-shaped groove.

* * * * *